(12) United States Patent
Tang et al.

(10) Patent No.: US 8,023,435 B2
(45) Date of Patent: Sep. 20, 2011

(54) DISTRIBUTION SCHEME FOR DISTRIBUTING INFORMATION IN A NETWORK

(75) Inventors: Haitao Tang, Helsinki (FI); Jani Lakkakorpi, Helsinki (FI)

(73) Assignee: Nokia Corporation, Espoo (FI)

( * ) Notice: Subject to any disclaimer, the term of this patent is extended or adjusted under 35 U.S.C. 154(b) by 683 days.

(21) Appl. No.: 10/512,061

(22) PCT Filed: May 8, 2002

(86) PCT No.: PCT/IB02/01605
§ 371 (c)(1),
(2), (4) Date: Oct. 21, 2004

(87) PCT Pub. No.: WO03/096632
PCT Pub. Date: Nov. 20, 2003

(65) Prior Publication Data
US 2005/0254448 A1    Nov. 17, 2005

(51) Int. Cl.
*H04L 12/44* (2006.01)
*H04L 12/28* (2006.01)
*H04W 4/00* (2009.01)

(52) U.S. Cl. .................. 370/256; 370/238; 370/328
(58) Field of Classification Search .................. 370/328, 370/252, 238, 352, 216, 389, 229, 256, 338
See application file for complete search history.

(56) References Cited

U.S. PATENT DOCUMENTS

| | | | |
|---|---|---|---|
| 4,466,060 A * | 8/1984 | Riddle .......................... | 709/242 |
| 5,150,360 A * | 9/1992 | Perlman et al. ................ | 370/402 |
| 5,946,316 A * | 8/1999 | Chen et al. .................... | 370/408 |
| 6,353,596 B1 * | 3/2002 | Grossglauser et al. ........ | 370/256 |
| 6,987,727 B2 * | 1/2006 | Fredette et al. ................ | 370/225 |
| 7,286,489 B2 * | 10/2007 | Ades .............................. | 370/254 |
| 7,310,335 B1 * | 12/2007 | Garcia-Luna-Aceves et al. ................... | 370/390 |
| 7,334,047 B1 * | 2/2008 | Pillay-Esnault .............. | 709/242 |
| 2001/0017723 A1 * | 8/2001 | Chang et al. .................. | 359/128 |
| 2002/0004843 A1 * | 1/2002 | Andersson et al. ............ | 709/238 |
| 2002/0023170 A1 * | 2/2002 | Seaman et al. ................ | 709/235 |
| 2002/0150041 A1 * | 10/2002 | Reinshmidt et al. .......... | 370/216 |
| 2003/0023750 A1 * | 1/2003 | Basturk ......................... | 709/241 |
| 2003/0026268 A1 * | 2/2003 | Navas ............................ | 370/400 |
| 2003/0095504 A1 * | 5/2003 | Ogier ............................. | 370/235 |

FOREIGN PATENT DOCUMENTS
WO    WO 00/70782    11/2000

OTHER PUBLICATIONS

Cidon et al, "Control Mechanissms for High Speed Networks", International Conference on Communications. Including Supercomm Technical Sessions, Atlanta, Apr. 15-19, 1990, vol. 2, Apr. 15, 1990, pp. 259-263, XP000146078. Yum et al, "Multicast Source Routing in Packet-Switched Networks", Networking in the Nineties. Bal Harbour, Apr. 7-11, 1991 Proceedings of the Annual Joint Conference of the Computer and Communications Societies. (INFOCOM), vol. 2, Conf. 10, Apr. 7, 1991, pp. 1284-1288, XP010042520.

* cited by examiner

*Primary Examiner* — Christopher M Brandt
(74) *Attorney, Agent, or Firm* — Squire, Sanders & Dempsey (US) LLP

(57) ABSTRACT

The present invention relates to a method and network node for distributing a network parameter information among network nodes of a transmission network. A spanning tree of routing paths corresponding to the shortest paths from said network node to other nodes is determined based on a topology information of the transmission network, and is used to distribute the network parameter information from the network node to the other network nodes. Thereby, the updating message or packet traffic can be reduced dramatically as compared to the conventional flooding scheme.

43 Claims, 3 Drawing Sheets

| From | To | Link | Cost |
|------|-----|------|------|
| A | B | L1 | 1 |
| A | D | L3 | 1 |
| B | A | L1 | 1 |
| B | C | L2 | 1 |
| B | E | L4 | 1 |
| C | B | L2 | 1 |
| C | E | L5 | 1 |
| D | A | L3 | 1 |
| D | E | L6 | 1 |
| E | B | L4 | 1 |
| E | C | L5 | 1 |
| E | D | L6 | 1 |

| From A to | Next Hop Port | Metric/cost | Via Node(s) in the order |
|-----------|---------------|-------------|--------------------------|
| A | Local net | 0 | A |
| B | L1 | 1 | B |
| D | L3 | 1 | D |
| C | L1 | 2 | B |
| E | L1 | 2 | B |

DISTRIBUTION SCHEME FOR DISTRIBUTING INFORMATION IN A NETWORK

FIELD OF THE INVENTION

The present invention relates to a method and network node for distributing a network parameter information, which may consist of link utilization, node utilization, Macro Diversity Combining (MDC) load, and any other Quality of Service (QoS) related parameters associated to a given network node, among network nodes of a transmission network such as a radio access network for providing a connection to an Internet Protocol (IP) based a core network. In particular, the distributed network parameter information may be used by a procedure for selecting an MDC point in the radio access network (RAN).

BACKGROUND OF THE INVENTION

In a Code Division Multiple Access (CDMA) based cellular network all users in the same cell or in different cells may share the same frequency spectrum simultaneously. In spread spectrum transmission, the interference tolerance enables universal frequency reuse. This enables new functions such as soft handover, but also causes strict requirements on power control. Due to the universal frequency reuse, the connection of a radio terminal, e.g. a mobile terminal, mobile station or user equipment to the cellular network can include several radio links. When the radio terminal is connected through more than one radio link, it is said to be in soft handover. If, in particular, the radio terminal has more than one radio link to two cells on the same side, it is in softer handover. Soft handover is a form of diversity, increasing the signal-to-noise ratio when the transmission power is constant.

At network level, soft handover smoothes the movement of a mobile terminal from one cell to another. It helps to minimize the transmission power needed in both uplink and downlink.

Thus, a radio terminal of a network subscriber can transmit the same information on a plurality of redundant transmission parts that are set up parallel via a radio transmission interface from the cellular network to the radio terminal or from the radio terminal to the cellular network in order to achieve an optimal transmission quality. Such a transmission structure is called macrodiversity. The redundant transmission paths can be dynamically set up and cleared down while the radio terminal changes its location. The information sent out by the radio terminal in the transmission frames on various trans-mission paths can be merged in the trans-mission network at combination points at which respectively two transmission paths are combined into a single transmission path in one transmission direction (uplink) and the single transmission path is divided into two transmission paths in the other trans-mission direction (downlink). A corresponding network architecture is described for example in the U.S. Pat. No. 6,198,737 B1.

In order to obtain the most efficient RAN architecture, which is based on using the advantageous characteristics of IP, some functionality is relocated between network elements. According to a recent new architecture, a network element, known as Base Station Controller (BSC) or Radio Network Controller (RNC) is no longer required, although this functionality must remain in the RAN architecture. Therefore, a location of a combining point, e.g. MDC point, can no longer be centralized for all base stations in the RAN. Consequently, some RNC functionality has been transferred to the base stations in order to enable soft handover and associated signaling to happen along the shortest path, producing minimum delay and signaling load to those paths of the network where this is not necessary. This new RAN architecture is described e.g. in the White Paper "IP-RAN, IP—the future of mobility", Nokia Networks, 2000.

In such a new RAN architecture, the MDC point can be selected dynamically e.g. by a serving base station instead of having this functionality in one pre-selected point like the RNC in the conventional RAN architecture or in the base station that initiates the call. In the new RAN architecture, base stations are able to act as MDC points.

However, in order to select the MDC point dynamically, the corresponding network node or entity needs up-to-date information of the RAN network, e.g. its parameters such as link state, link utilization, node utilization, MDC load, and any other QoS-related parameters. When any change of a parameter happens, the change parameter needs to be distributed among the network nodes or entities. In addition, any change of a parameter will invoke a tide of messages or packets in the network for keeping all network nodes updated. If the known flooding scheme as described e.g. in J. Moy, "OSPF Version 2", IETF specification RFC1583, 1994 is used, a parameter change can, in the worst case, invoke as many messages or packets as twice the total number of links in the RAN. Thus, updating traffic may become a source of network congestion itself. Furthermore, the flooding scheme is not scalable with an increase of the dimension of the RAN. Given the on-changing nature of the RAN, a scalable and efficient distribution scheme is therefore required for this purpose.

SUMMARY OF THE INVENTION

It is therefore an object of the present invention to provide a method and network node for distributing a network parameter information, by means of which a more efficient and scalable distribution can be provided.

This object is achieved by a method of distributing a network parameter information among network nodes of a transmission network, said method comprising the steps of:
determining based on a topology information of said transmission network a spanning tree of routing paths corresponding to the shortest paths from said network node to other nodes;
detecting a network parameter change in a network node of said transmission network; and
distributing said network parameter information indicating said network parameter change from said network node to said other nodes in accordance with said spanning tree.

Furthermore, the above object is achieved by a network node for distributing a network parameter information to other network nodes of a transmission network, said network node being arranged to detect a change in a network parameter related to said network node, and to distribute said network parameter information indicating said network parameter change towards said other network nodes in response to said detection and in accordance with a spanning tree of routing paths corresponding to the shortest paths from said network node to said other network nodes.

Additionally, the above object is achieved by a network node for distributing a network parameter information to other network nodes of a transmission network, said network node being arranged to receive a network parameter information from an upper node, to update a stored parameter information according to said received network parameter information, and to distribute said network parameter information to its offspring network nodes based on a branch information included in said network parameter information, said branch information being derived from a spanning tree routing topology.

Accordingly, a distribution scheme for distributing network parameters among network nodes in a much more efficient and scalable way than the flooding approach is provided. The distributed network parameters may be used by a procedure to dynamically select an MDC point in a RAN. As the other nodes get informed about the changed parameters, they can have an up-to-date view of the network e.g. so as to select a MDC point for a given call.

Due to the distribution according to the spanning tree, one parameter change only invokes as many updating messages or packets as a small fraction of the total number of links in the transmission network. Hence, updating messages or packets initiated by a given node only travel through a given spanning tree of the transmission network. Utilizing the topology information of the network, the delivery of the parameter information can be optimized and improved e.g. to avoid the conventional flooding scheme. Thereby, the updating message or packet traffic can be reduced dramatically as compared to the traffic of the flooding scheme under the same condition.

The network parameter information may relate to a QoS related parameter. In particular, the network parameter information may comprise at least one of a link state, a link utilization, a node utilization, and a macro diversity combining load.

The topology information may be derived from at least one routing table, which may be provided for each network node. The routing table may provide a branch information for each offspring node of the network node. The branch information may indicate branches of the concerned offspring node.

Furthermore, the topology information may be derived from a link state database of a routing protocol of the transmission network. Alternatively, the topology information may be obtained by running a flooding scheme and a shortest-path-first algorithm. If the network topology is relatively stable, the overhead caused by running such a flooding scheme can be considered rather small.

Based on the topology information, it can be decided on those parameters to be included in the network parameter information.

Preferably, the network parameter information may comprise an updating information sent to each offspring node. Each updating information may comprise a branch information, a parameter update information and a node identification of the network node at which said network parameter change has occurred. A received updating information may then be distributed from an offspring node to an offspring node of said offspring node based on said branch information. A parameter information stored at said offspring node can be updated using said updating information.

The network parameter information may be used in an MDC point selection procedure.

BRIEF DESCRIPTION OF THE DRAWINGS

In the following, the present invention will be described in greater detail based on a preferred embodiment with reference to the accompanying drawings, in which.

DESCRIPTION OF THE PREFERRED EMBODIMENT

The preferred embodiment will now be described on the basis of a new RAN network architecture for providing access to an IP network.

Figure 1:
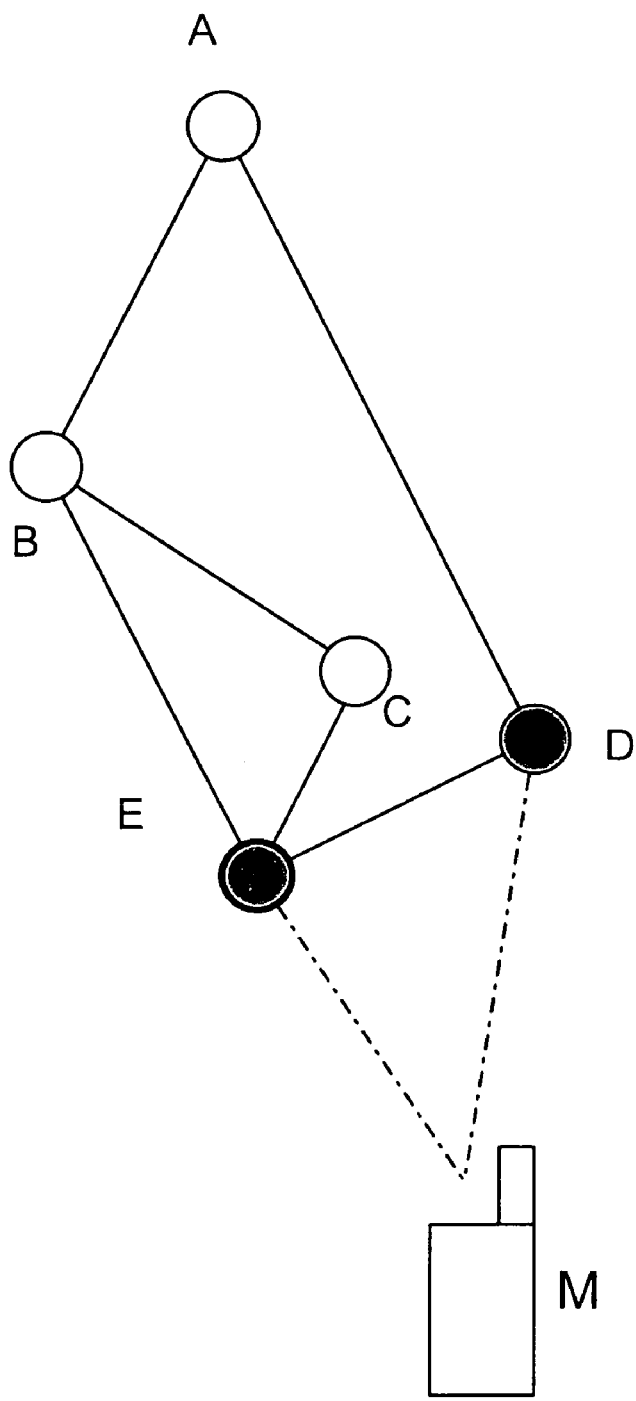
FIG. 1 shows a schematic diagram of a radio access network topology in which the present invention can be implemented.

According to FIG. 1, a mobile terminal M is connected to a RAN via two redundant transmission paths indicated by respective dash-dot lines. The RAN architecture comprises a plurality of network nodes A to E, e.g. IP-based base stations, wherein the shaded nodes D and E are currently connected to the mobile terminal M via the redundant transmission paths. In particular, the network node E indicated with the bold circle is used as the serving base station, i.e. the base station terminating the core network interfaces data stream, and performing Radio Resource Management (RRM) functions like scheduling, power control and the like. In contrast thereto, the other shaded base station D is used as a drift base station providing only resources and radio L1 layer functions for the respective connections to the mobile terminal M.

In the RAN topology shown in FIG. 1, contrary to conventional RANs, most of the functions of a former centralized controller (e.g. RNC or BSC) are moved to the base stations. In particular, all radio interface protocols are terminated in the base stations. Entities outside the base stations are needed to perform common configuration and some radio resource functions, or interworking with legacy, gateways to a core network, etc. An interface is needed between the base stations, supporting both control plane signaling and user plane traffic. Full connectivity among the entities may be supported over an IPv6 (Internet Protocol Version 6) transport network. Furthermore, a RAN Gateway (RNGW, not shown) may be provided which is the IP user plane access point from the IP-based core network or other RAN to the present RAN. During a radio access bearer assignment procedure, the RAN returns to the core network transport addresses owned by the RNGW where the user plane shall be terminated. Additionally, packet-switched and circuit-switched interfaces are connected through the RNGW.

In the situation shown in FIG. 1, one network node has to be selected as the MDC point for the connections to the mobile terminal M, e.g. by the serving node E. This selection can be optimized if the required network parameter information is continuously updated based on a distribution scheme.

According to the preferred embodiment, a distribution scheme is provided for distributing up-to-date information of the whole RAN, e.g. its parameters such as link state, link utilization, node utilization, MDC load, and any other QoS-related parameters, among the network nodes or entities A to E, which may be used e.g. to dynamically select the MDC point. E.g., when any change of a parameter happens in Node A, a corresponding parameter change information is initiated by Node A and distributed among the network nodes B to E.

This is achieved by utilizing a topology information of the network to optimize or improve the delivery of the parameters and to avoid the use of a flooding scheme.

According to the present distribution scheme, the network is denoted as a undirected path G(N, L), where N denotes a set of all nodes in the network, e.g. IP routers or IP base stations A to E in FIG. 1, and N={N1, N2, ... Nk}, and where L denotes a set of all links of the graph. The parameter set of a given node Ni is expressed by Pi, wherein Pi ={Pi1, Pi2, Pi3, ..., Pim}. Furthermore, a routing table allocated to the given node Ni is expressed by Ri, wherein Ri={Ri1, Ri2, Ril} and wherein Rin denotes the branch information of the n-th immediate offspring node of the given node Ni. It is noted that the routing table Ri of a given node i (i=1 to k) and the network topology of the RAN can be imported e.g. from a routing table (or a link state database) of the routing protocol in the IP-based network, e.g. an Open Shortest Path First (OSPF) routing protocol which is a link-state protocol using flooding of link-state information and a least-cost-path algorithm. With OSPF, e.g. a router constructs a complete topological map of the entire system. The router then locally runs the shortest-path algorithm to determine a shortest-path tree to all networks with itself as the route node. The routers' routing table is then obtained from this shortest-path tree. Individual link costs can be configured by the network administrator. Similarly, the network topology information can be obtained from an ISIS routing protocol.

Alternatively, the routing table of a given node and the network topology of the RAN can be learned by running a flooding scheme and a shortest-path-first algorithm individually when the used routing protocol such as the Routing Information Protocol (RIP) does not provide such an information. Due to the fact that the network topology is relatively stable, the overhead of running the flooding scheme and the shortest-path-first algorithm can be considered rather small for this case. Then, the graph G(N, L) can be derived from the learned or imported network topology information.

Based on the network topology, it is then decided which parameters to be included in the parameter sets Pi (i=1 to k) and their data type can be defined via configuration according to specific requirements. The required parameters of the parameter sets Pi may be measured on demand, whenever needed, or may be provided or measured at predetermined intervals.

When a parameter change is detected at a specific network node, this network node becomes the initiating node of the following update procedure:

If a parameter Pis changes at Node Ni,
    Update Pis in Pi with the new Pis
    For n=1 to 1,
        Node Ni sends the updating tuple (Rin Pis Ni-ID) to its nth immediate offspring node
    end
end Thus, if it is detected at the initiating node that the parameter Pis has changed at a node Ni, the parameter sets Pi are updated according to the new value of the parameter Pis. Then, the initiating node generates for each of its immediate offspring nodes a respective updating information, e.g. an updating tuple, comprising the branch information Rin, the updated parameter value Pis and a node identification Ni-ID of the concerned network node Ni, and sends the respective updating information to all immediate offspring node.

An offspring node receiving such an update information performs the following procedure:

If a node receives a tuple (Rin Pis Ni-ID) for updating,
    Update the Pis recorded in this node, with the Pis in the coming tuple
    If Rin is not empty,
        partition Rin into the branches of immediate offspring, i.e., Rin={Rin1, ... Rinh}
        For g=1 to h; 'h' is the total number of the immediate offspring nodes of this node
            Rin=Ring;
            Send the updating tuple (Rin Pis Ni-ID) to the gth immediate offspring node (shown in Rin) of this node
        end
    end
end According to this algorithm, the offspring node updates the changed parameter Pis in its parameter sets Pi recorded in the offspring node. If the branch information Rin is empty, i.e. this branch does not include any further node, the offspring node only updates its parameter sets Pi. On the other hand, if the branch information Rin is not empty, the offspring nodes partitions or separates the branch information into its branches of immediate offspring and sends a respective updating information with the new (partitioned) branch information to all its immediate offspring nodes.

Thereby, the updating information is transmitted through the network based on the initial branch information defined by the initiating node.

Figure 3:
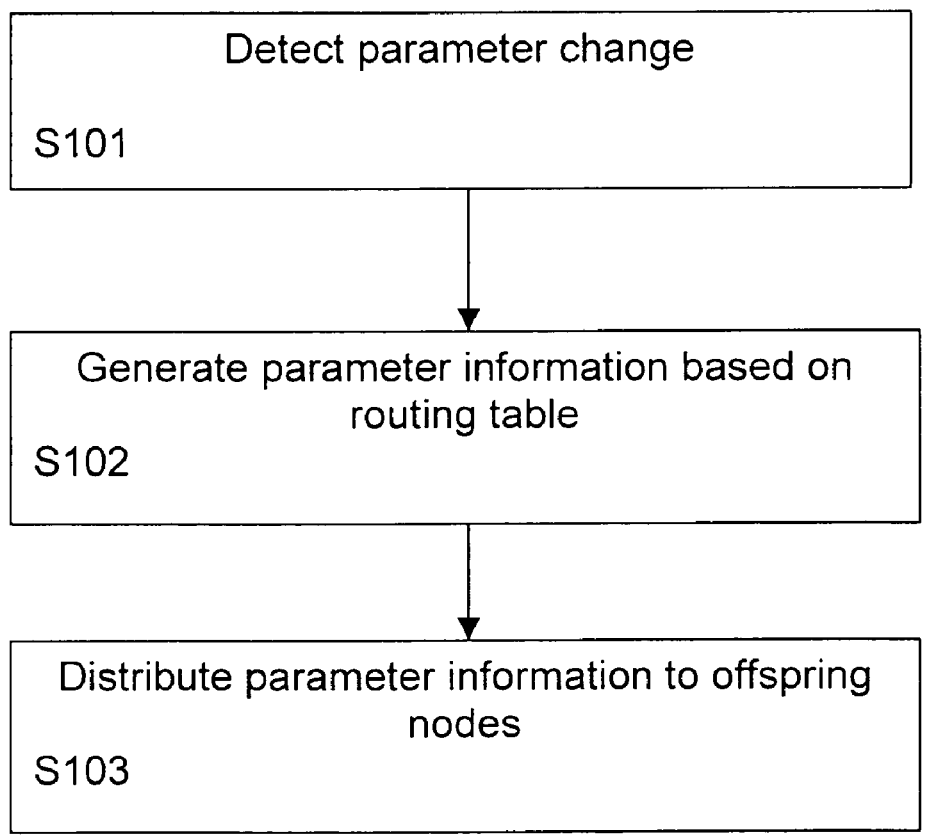
FIG. 3 shows a flow diagram indicating basic steps of a distribution procedure according to the preferred embodiment of the present invention.

FIG. 3 shows a basic flow diagram indicating the distribution or updating procedure according to the preferred embodiment. In step S101, a parameter change is detected at a specific network node. In response thereto this network node generates a parameter information based on a routing table corresponding to the network location of this network node. The parameter information comprises the branch information obtained from the routing table, the updated parameter, and the identification of the network node at which the parameter has been changed (step S102). Then, the network node distributes the generated parameter information to its offspring nodes in step S103, so that the offspring nodes forward the parameter information based on the received branch information.

Figure 2:
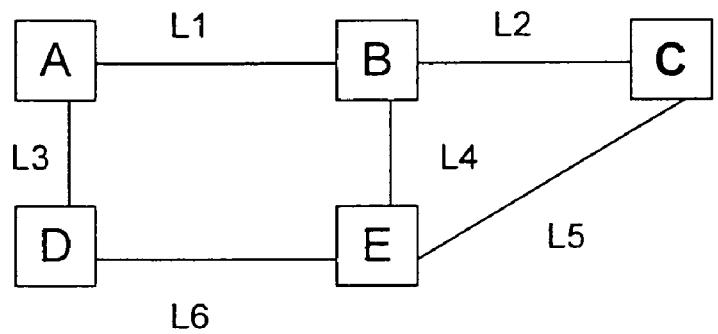
FIG. 2 shows a structured topology of the radio access network according to FIG. 1.
Figures 4, 5, 6:
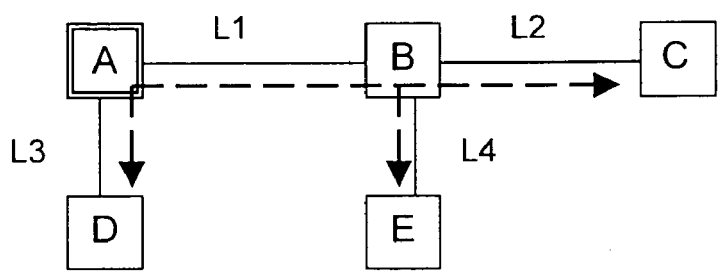
FIG. 4 shows a table of a link state database, indicating the network topology according to FIGS. 1 and 2.
FIG. 5 shows a routing table for a distribution scheme according to the preferred embodiment of the present invention.
FIG. 6 shows a spanning tree for forwarding a parameter information according to the preferred embodiment of the present invention.

FIG. 4 shows a table of link state database indicating the network topology of the radio access network shown in FIGS. 1 and 2. In the present example, it is assumed that all links between the network nodes have the same bandwidth "1", wherein a cost parameter is defined by cost=1/bandwidth.

The routing table for a specific network node is then obtained on the basis of a spanning tree calculated by the network node on account of the known network topology. The spanning tree can be understood here as a loop-less graph. Thus, the spanning tree is defined by the sending or initiating node or entity instead of e.g. some centralized controller node like RNC or BSC. By using the spanning tree algorithm, routing of data in loops can be prevented. Due to the fact that network nodes know the network topology, they can calculate optimal distribution paths for the network parameter information based on the spanning tree algorithm. In general, a spanning tree is a subset of the original network topology, which has no loops.

FIG. 5 shows a routing table for the network node A in FIGS. 1 and 2, which has been obtained from a spanning tree algorithm. The term "in the order" in the last column means the routing order of visited nodes when sending a packet from a source node, i.e. the network node A, to a destination node, i.e. the node indicated in the first column, along a routing path indicated in the second column. For example, if a packet comprising an updated parameter information is transmitted from the network node A to the network node C, it is routed through the link L1 and via the network node B, while two links are used as indicated as by the cost parameter in the third column. Assuming that another network node F would be connected to the network node C, the value of the last column for routing a packet from the network node A to the network node F would be "BC", as the updated parameter would be routed via the networks nodes B and C.

FIG. 6 shows the spanning tree obtained for the network node A. This spanning tree is used for distributing a packet to another node in the network, wherein the spanning tree shows the shortest routing paths from the network node A to all other nodes. These shortest paths are indicated by the broken arrows in FIG. 6. In the topology shown in FIG. 6, the upper network node A is connected to two immediate offspring nodes, i.e. the network nodes D and B, wherein the branch L3 of the network node D contains only the network node D itself while the branch L1 to the network node B contains another two branches L4 (BE) and L2 (BC).

As an example, it is assumed that a parameter Pa of the network node A has changed. Then, the network node A will send to its immediate offspring nodes D and B the following tuples:

1) to the node D: (NULL, Pa, A),
which indicates that the branch ends at the node D ("NULL") and that the parameter "Pa" has changed at the network node "A";

2) to the node B: ((BC,BE), Pa, A),
which indicates that the updating tuple is to be forwarded from the network node B to the offspring nodes C and E ("(BC,BE)"), and that the parameter "Pa" has changed at the network node "A".

Thus, when receiving the updating tuple (NULL, Pa, A), the network node D will only update its own Pa in its set of parameters, and will not route this updating tuple to any other network node. Thereby, the link L6 in FIG. 2 is not used in the distribution scheme.

Furthermore, when receiving the updating tuple ((BC,BE), Pa, A), the network node B will first update its own Pa and then send to the network node E a revised tuple (NULL, Pa, A) indicating that the branch ends at the network node E, and to the network node C a revised tuple (NULL, Pa, A) indicating that the branch ends at the network node C. Thereby, multiple transmission through the link L5 in FIG. 2 can be prevented.

In the above example, and using the distribution scheme according to the preferred embodiment of the present invention, one parameter change invokes only four updating messages, while the flooding scheme can invoke twelve messages in the worst case.

It is noted, that the present invention is not restricted to the above preferred embodiments, but can be used in any network environment where a network parameter information has to be distributed from a specific network node to a plurality of other network nodes. Thus, the preferred embodiments may vary within the scope of the attached claims.

The invention claimed is:

1. A method comprising:
   detecting a network parameter change in a network node of a transmission network;
   determining, based on topology information of a radio access network, a spanning tree of routing paths corresponding to shortest paths from the network node to all other nodes; and
   distributing network parameter information indicating said network parameter change from said network node to said other nodes in accordance with said spanning tree,
   wherein said network node is configured to generate, for each of its immediate offspring nodes, a respective updating information and to send said respective updating information to all of the immediate offspring nodes, and
   wherein the respective updating information sent to the immediate offspring nodes differs for each of the immediate offspring nodes based on the spanning tree structure.

2. A method according to claim 1, wherein said network parameter information is used in a network operation and management procedure in a radio access network.

3. A method according to claim 2, wherein said network operation and management procedure is a macro diversity combining point selection procedure.

4. A method according to claim 1, wherein said network parameter information relates to a quality of service related parameter.

5. A method according to claim 4, wherein said network parameter information comprises at least one of a link state, a link utilization, a node utilization, and a macro diversity combining load.

6. A method according to claim 1, further comprising deriving said topology information from at least one routing table.

7. A method according to claim 6, wherein one routing table is provided for each network node.

8. A method according to claim 7, wherein said one routing table provides a branch information for each of the immediate offspring nodes of said network node.

9. A method according to claim 8, wherein said branch information indicates branches of the concerned immediate offspring node.

10. A method according to claim 1, further comprising deriving said topology information from a link state database of a routing protocol of said transmission network.

11. A method according to claim 1, further comprising obtaining said topology information by running a flooding scheme and a shortest-path-first algorithm.

12. A method according to claim 1, further comprising deciding on those parameters to be included in said network parameter information based on said topology information.

13. A method according to claim 1, wherein said network parameter information comprises said updating information sent to each of the immediate offspring nodes.

14. A method according to claim 13, wherein said updating information comprises a branch information, a parameter update information and a node identification of the network node at which said network parameter change has occurred.

15. A method according to claim 13, further comprising distributing a received updating information from the immediate offspring nodes of said network node to an immediate offspring node of said immediate offspring nodes based on a branch information.

16. A method according to claim 13, further comprising updating a parameter information stored at said immediate offspring nodes using said updating information.

17. A method according to claim 1, wherein said transmission network is a radio access network based on internet protocol technology.

18. An apparatus, comprising:
  at least one memory including computer program code; and
  at least one processor,
  wherein the at least one memory and computer program code are configured to, with the at least one processor, cause the apparatus at least to
  detect a change in a network parameter related to said apparatus;
  distribute a network parameter information to network nodes of a transmission network in accordance with a spanning tree of routing paths corresponding to shortest paths from said apparatus to all other network nodes, wherein the network parameter information is configured to indicate the change in said network parameter to said network nodes in response to said detection;
  generate for each of a plurality of immediate offspring nodes a respective updating information; and
  send said respective updating information to all the immediate offspring nodes,
  wherein the respective updating information sent to the immediate offspring nodes differs for each of the immediate offspring nodes based on the spanning tree structure.

19. An apparatus according to claim 18, wherein said spanning tree is derived from a topology information of said transmission network.

20. An apparatus according to claim 19, wherein said apparatus is a network node configured to decide on those parameters to be included in said network parameter information based on said topology information.

21. An apparatus according to claim 18, wherein said apparatus is a base station of a radio access network.

22. The apparatus according to claim 18, wherein said network parameter information is configured to be used in a network operation and management procedure in a radio access network.

23. The apparatus according to claim 22, wherein said network operation and management procedure is a macro diversity combining point selection procedure.

24. The apparatus according to claim 18, wherein said network parameter information relates to a quality of service related parameter.

25. The apparatus according to claim 18, wherein said network parameter information comprises at least one of a link state, a link utilization, a node utilization, and a macro diversity combining load.

26. The apparatus according to claim 18, wherein the at least one memory and computer program code are also configured to, with the at least one processor, cause the apparatus at least to derive said topology information from at least one routing table.

27. The apparatus according to claim 26, wherein one routing table is provided for each network node.

28. The apparatus according to claim 27, wherein said one routing table provides a branch information for each of the immediate offspring nodes of said network node.

29. The apparatus according to claim 28, wherein said branch information indicates branches of the concerned immediate offspring nodes.

30. The apparatus according to claim 18, wherein the at least one memory and computer program code are also configured to, with the at least one processor, cause the apparatus at least to derive said topology information from a link state database of a routing protocol of said transmission network.

31. The apparatus according to claim 18, wherein the at least one memory and computer program code are also configured to, with the at least one processor, cause the apparatus at least to obtain said topology information by running a flooding scheme and a shortest-path-first algorithm.

32. The apparatus according to claim 18, wherein the at least one memory and computer program code are also configured to, with the at least one processor, cause the apparatus at least to decide on those parameters to be included in said network parameter information based on said topology information.

33. The apparatus according to claim 18, wherein said network parameter information comprises said updating information sent to each of the immediate offspring nodes.

34. The apparatus according to claim 33, wherein said updating information comprises a branch information, a parameter update information and a node identification of the network node at which said network parameter change has occurred.

35. The apparatus according to claim 33, wherein the at least one memory and computer program code are also configured to, with the at least one processor, cause the apparatus at least to cause to be distributed a received updating information from the immediate offspring nodes of said network node to an immediate offspring node of said immediate offspring nodes based on said branch information.

36. The apparatus according to claim 33, wherein the at least one memory and computer program code are also configured to, with the at least one processor, cause the apparatus at least to update a parameter information stored at said immediate offspring nodes using said updating information.

37. The apparatus according to claim 18, wherein said transmission network is a radio access network based on internet protocol technology.

38. An apparatus, comprising:
  at least one memory including computer program code; and
  at least one processor,
  wherein the at least one memory and computer program code are configured to, with the at least one processor, cause the apparatus at least to
  distribute a network parameter information to network nodes of a radio access network;
  receive a network parameter information from an upper node, to update a stored parameter information according to said received network parameter information, and
  distribute said network parameter information to immediate offspring network nodes of the apparatus based on branch information included in said network parameter information, said branch information being derived from a spanning tree routing topology corresponding to shortest paths from the apparatus to all other network nodes; and
  update said branch information in said network parameter information before distributing said network parameter information to said network nodes,
  wherein the updated information is sent to the network nodes and said updated information differs for each of the network nodes based on the spanning tree topology.

39. An apparatus according to claim 38, wherein said network nodes are immediate offspring nodes of said network node.

40. An apparatus according to claim 38, wherein said network node is a base station device of a radio access network.

41. A system, comprising:
  detecting means for detecting a network parameter change in a network node of a network;
  determining means for determining, based on topology information of a radio access network, a spanning tree of routing paths corresponding to shortest paths from the network node to all other nodes; and distributing means for distributing network parameter information indicating said network parameter change from said network node to said other nodes in accordance with said spanning tree, wherein said network node is configured to generate, for each of its immediate offspring nodes, a respective updating information and to send said respective updating information to all the immediate offspring nodes, wherein the respective updating information sent to the immediate offspring nodes differs for each of the immediate offspring nodes based on the spanning tree structure.

42. An apparatus, comprising:

detecting means for detecting a change in a network parameter related to said apparatus;

distributing means for distributing a network parameter information to network nodes of a transmission network;

wherein the distributing means distributes said network parameter information indicating said network parameter change towards said network nodes in response to said detection and in accordance with a spanning tree of routing paths corresponding to shortest paths from said apparatus to all other network nodes, generating means for generating for each of a plurality of immediate offspring nodes a respective updating information; and transmitting means for transmitting said respective updating information to all of the immediate offspring nodes, wherein the respective updating information sent to the immediate offspring nodes differs for each of the immediate offspring nodes based on the spanning tree structure.

43. An apparatus, comprising:

distributing means for distributing a network parameter information to network nodes of a radio access network;

receiving means for receiving a network parameter information from an upper node, to update a stored parameter information according to said received network parameter information, and wherein the distributing means distributes said network parameter information to its immediate offspring network nodes based on a branch information included in said network parameter information, said branch information being derived from a spanning tree routing topology corresponding to shortest paths from the apparatus to all other network nodes; and updating means for updating said branch information in said network parameter information before distributing said network parameter information to said immediate offspring nodes, wherein the updated network parameter information sent to the immediate offspring nodes differs for each of the immediate offspring nodes based on the spanning tree structure.

* * * * *